(12) United States Patent
Zhao et al.

(10) Patent No.: US 12,388,390 B2
(45) Date of Patent: Aug. 12, 2025

(54) NONRECIPROCAL SOLAR THERMOPHOTOVOLTAICS

(71) Applicant: University of Houston System, Houston, TX (US)

(72) Inventors: Bo Zhao, Pearland, TX (US); Sina Jafari Ghalekohneh, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 0 days.

(21) Appl. No.: 18/120,497

(22) Filed: Mar. 13, 2023

(65) Prior Publication Data

US 2023/0318517 A1 Oct. 5, 2023

Related U.S. Application Data

(60) Provisional application No. 63/408,168, filed on Sep. 20, 2022, provisional application No. 63/330,426, filed on Apr. 13, 2022, provisional application No. 63/325,733, filed on Mar. 31, 2022.

(51) Int. Cl.
| | |
|---|---|
| *H02S 10/30* | (2014.01) |
| *H02S 40/32* | (2014.01) |
| *G02B 6/12* | (2006.01) |
| *G02B 6/24* | (2006.01) |
| *G02B 6/35* | (2006.01) |
| *G02B 17/06* | (2006.01) |
| *H02S 40/38* | (2014.01) |

(52) U.S. Cl.
CPC .............. *H02S 10/30* (2014.12); *H02S 40/32* (2014.12); *G02B 2006/12126* (2013.01); *G02B 6/243* (2013.01); *G02B 6/353* (2013.01); *G02B 17/0673* (2013.01); *H02S 40/38* (2014.12)

(58) Field of Classification Search
CPC .......... H02S 10/30; H02S 40/32; H02S 40/38; G02B 6/243; G02B 6/353; G02B 17/0673; G02B 2006/12126; G02B 1/005; G02B 5/003
See application file for complete search history.

(56) References Cited

U.S. PATENT DOCUMENTS

2007/0227579 A1* 10/2007 Buller ................... H01L 31/046
257/E27.125

FOREIGN PATENT DOCUMENTS

CN 104603540 B 4/2018

OTHER PUBLICATIONS

Andrej Lenert "A nanophotonic solar thermophotovoltaic device" Nature Nanotechnology | vol. 9 | Feb. 2014 (Year: 2014).*

(Continued)

*Primary Examiner* — Michael Y Sun
(74) *Attorney, Agent, or Firm* — George Likourezos; Carter, DeLuca & Farrell LLP

(57) ABSTRACT

A nonreciprocal Solar thermophotovoltaic (STPV) system includes an absorber configured to absorb broad-spectrum solar radiation and generate heat an intermediate emitter, and a single-junction photovoltaic cell configured to convert solar radiation to electrical energy. The intermediate emitter includes nonreciprocal radiative properties. The nonreciprocal radiative properties include absorbing light from the front side but only emitting light to the backside.

11 Claims, 9 Drawing Sheets

(56) References Cited

OTHER PUBLICATIONS

C. A. Wang "High-quantum-efficiency 0.5 eV GaInAsSb/GaSb thermophotovoltaic devices" Appl. Phys. Lett. 75, 1305-1307 (1999) (Year: 1999).*
Fabrice Kwefeu Mbakop "One-dimensional comparison of Tio2/SiO2 and Si/SiO2 photonic crystals filters for thermophotovoltaic applications in visible and infrared" (Year: 2020).*
Zunaid Omair "Ultraefficient thermophotovoltaic power conversion by band-edge spectral filtering" 15356-15361 | PNAS | Jul. 30, 2019 | vol. 116 | No. 31 (Year: 2019).*
Yubin Park, et al., "Violating Kirchhoff's Law of Thermal Radiation in Semitransparent Structures", ACS Photonics 2021, 8, pp. 1-8, 2021.
Martin Green, "Time-Asymmetric Photovoltaics", Nano Letters, 12, (11), pp. 1-4, 2012.
Yubin Park, et al., "Reaching the Ultimate Efficiency of Solar Energy Harvesting with a Nonreciprocal Multijunction Solar Cell", Nano Letters, 22, pp. 1-5, 2021.
David M. Bierman, et al., "Enhanced photovoltaic energy conversion using thermally based spectral shaping", Nat. Energy, 1, (6), pp. 1-8, May 23, 2016.
A. Kohiyama, et al., "Unidirectional radiative heat transfer with a spectrally selective planar absorber/emitter for high-efficiency solar thermophotovoltaic systems", Appl. Phys. Express 9, (11), pp. 1-5, 2016.
Rajendra Bhatt, et al., "High-efficiency solar thermophotovoltaic system using a nanostructure-based selective emitter", Sol. Energy, 197, pp. 1-8, 2020.
Sina Jafari Ghalekohneh, et al., "Nonreciprocal Solar Thermophotovoltaics", Physical Review Applied 18, pp. 1-9, 2022.
International Search Report and Written Opinion issued by the ISA/US in connection with International Application No. PCT/US23/15064, dated Oct. 4, 2023.
Siddharth Buddhiraju, et al., "Thermodynamic limits of energy harvesting from outgoing thermal radiation", PNAS, vol. 115, No. 16., pp. 1-7, Apr. 2, 2018.
T.C. Huang, et al., "A novel selective thermophotovoltaic emitter based on multipole resonances", International Journal of Heat and Mass Transfer, pp. 1-8, 2022.
International Preliminary Report on Patentability issued by the International Bureau of WIPO in connection with International Application No. PCT/US2023/015064, dated Sep. 24, 2024.

* cited by examiner

| Aero Ratio $\beta$ | Bandgap of the Cell $E_g$ (eV) | Bandwidth of the Emitter $\Delta E$ (eV) |
|---|---|---|
| 1 | 1.11 | Inf |
| 2 | 1.177 | 3.513 |
| 3 | 1.208 | 2.12 |
| 4 | 1.223 | 1.626 |
| 5 | 1.231 | 1.367 |
| 10 | 1.224 | 0.806 |
| 15 | 1.21 | 0.618 |
| 25 | 1.192 | 0.446 |
| 50 | 1.166 | 0.292 |
| 100 | 1.131 | 0.193 |
| 200 | 1.105 | 0.129 |
| 300 | 1.097 | 0.104 |
| 500 | 1.097 | 0.079 |
| 800 | 1.071 | 0.06 |
| 1500 | 1.097 | 0.045 |
| 3000 | 1.062 | 0.03 |

FIG. 9

| Aero Ratio $\beta$ | Bandgap of the Cell $E_g$ (eV) | Bandwidth of the Emitter $\Delta E$ (eV) |
|---|---|---|
| 1 | 1.177 | 3.513 |
| 2 | 1.208 | 2.130 |
| 3 | 1.223 | 1.626 |
| 4 | 1.231 | 1.348 |
| 5 | 1.232 | 1.168 |
| 10 | 1.223 | 0.756 |
| 15 | 1.208 | 0.594 |
| 25 | 1.192 | 0.432 |
| 50 | 1.157 | 0.287 |
| 100 | 1.14 | 0.193 |
| 200 | 1.114 | 0.129 |
| 300 | 1.105 | 0.104 |
| 500 | 1.097 | 0.079 |
| 800 | 1.071 | 0.06 |
| 1500 | 1.097 | 0.045 |
| 3000 | 1.062 | 0.03 |

FIG. 10

NONRECIPROCAL SOLAR THERMOPHOTOVOLTAICS

CROSS-REFERENCE TO RELATED APPLICATIONS

The present application claims the benefit of and priority to U.S. Provisional Patent Application Ser. No. 63/408,168, filed on Sep. 20, 2022, U.S. Provisional Patent Application Ser. No. 63/330,426, filed on Apr. 13, 2022, and U.S. Provisional Patent Application Ser. No. 63/325,733, filed on Mar. 31, 2022, the entire content of each being hereby incorporated by reference.

TECHNICAL FIELD

The present disclosure relates to nonreciprocal Solar thermophotovoltaic (STPV) systems.

BACKGROUND

As a popular way to harvest solar energy, solar cells play an important role in achieving energy sustainability and security. Typical solar cells, however, only use part of the solar spectrum that is above the bandgap of the cell to produce electricity. Such restriction constrains the efficiency of single-junction solar cells to the well-known Shockley-Queisser (SQ) limit (40.7%) for fully concentrated sunlight. Solar thermophotovoltaic (STPV) systems offer a solution to utilizing the full solar spectrum. An STPV system utilizes an intermediate layer between the sun and the STPV cell. The front side of the intermediate layer, i.e., the side facing the sun, is designed to absorb all photons coming from the sun. In this way, the solar energy is converted to the thermal energy of the intermediate layer and elevates the temperature of the intermediate layer. The backside of the intermediate layer is designed such that it only emits photons that have higher energy than the bandgap of the STPV cell. In doing so, STPV can harvest the full spectrum of solar radiation. The thermodynamic limit of STPVs has been shown to be the blackbody limit (85.4%). Besides the improved efficiency, STPVs promise compactness and dispatchability as compared to traditional solar cells. For example, one could store the thermal energy in the daytime in the thermal energy grid and convert this energy to produce electricity in the nighttime. Because of these attractive advantages and promises, STPVs have drawn tremendous attention in both small-scale and large-scale power production systems.

Despite the significant efficiency improvement over solar cells, traditional STPVs still have detrimental irreversibility or exergy destruction. This is because the intermediate layer in conventional STPVs is a reciprocal optical component, in which Kirchhoff's law of thermal radiation is valid. Therefore, the emissivity and absorptivity are always equal for a given direction, polarization, and frequency. Reciprocity guarantees that, while the intermediate layer is receiving the sunlight, there is unavoidable thermal emission from the front side of the intermediate layer towards the sun. Such back emission is intrinsic to the system and cannot be eliminated by spectral control of the emissivity of the absorber. Since the emission towards the sun cannot be harvested and essentially is lost, this back emission represents a primary intrinsic loss mechanism, especially considering that the temperature of the intermedia layer can reach 2000 K or even higher.

Accordingly, there is interest in advances in solar thermophotovoltaic technology.

SUMMARY

An aspect of the present disclosure provides a nonreciprocal solar thermophotovoltaic (STPV) system that includes an absorber configured to absorb broad-spectrum solar radiation and generate heat, an emitter having nonreciprocal radiative properties and configured to absorb the heat, and a photovoltaic cell configured to convert radiation from the emitter to electrical energy. The absorber is disposed on the emitter. The emitter is disposed on the photovoltaic cell.

In an aspect of the present disclosure, the emitter may be configured to increase a photon flux to the photovoltaic cell based on the nonreciprocal radiative properties.

In another aspect of the present disclosure, the emitter may be configured to absorb incident heat and emit a narrow-band infrared radiation.

In yet another aspect of the present disclosure, the emitter may include a first side configured to absorb incident heat and a second side configured to emit radiation.

In a further aspect of the present disclosure, the nonreciprocal radiative properties may include absorbing heat from the first side of the emitter and only emitting radiation from the second side of the emitter.

In yet a further aspect of the present disclosure, the photovoltaic cell may be a single-junction photovoltaic cell.

In an aspect of the present disclosure, the emitter may be configured to act as a heat circulator coupled with a blackbody.

In another aspect of the present disclosure, the emitter may be wavelength-selective within a frequency range above a bandgap of the photovoltaic cell.

In yet another aspect of the present disclosure, the emitter may include a photonic crystal made of Indium Arsenide, a Weyl semimetal, and/or a magneto-optical material.

In a further aspect of the present disclosure, the STPV system may include a planar or a cylindrical shape.

In an aspect of the present disclosure, a method of use for a nonreciprocal solar thermophotovoltaic (NSTPV) system includes generating heat, by an absorber configured to absorb broad-spectrum solar radiation incident thereon, absorbing the heat by a first side of an emitter having nonreciprocal radiative properties, and emitting radiation from a second side of the emitter.

In another aspect of the present disclosure, the method may further include absorbing the emitted radiation and converting, by the photovoltaic cell, the emitted radiation to electrical energy.

In yet another aspect of the present disclosure, the emitter may be configured to increase a photon flux to the photovoltaic cell based on the nonreciprocal radiative properties.

In a further aspect of the present disclosure, the emitter may be configured to absorb heat and provide a narrow-band infrared emission.

In yet a further aspect of the present disclosure, the nonreciprocal radiative properties may include absorbing heat incident upon the first side of the emitter and only emitting solar radiation from the second side of the emitter.

In an aspect of the present disclosure, the emitter may be configured to be transparent when solar radiation is incident upon the second side.

In another aspect of the present disclosure, the method may further include filtering the broad-band solar radiation to a frequency range narrower than the broad-band solar radiation by a wavelength-selective property of the emitter wherein the frequency range is above a bandgap of the photovoltaic cell.

In yet another aspect of the present disclosure, the emitter may include a photonic crystal made of Indium Arsenide, a Weyl semimetal, and/or a magneto-optical material.

In accordance with aspects of the disclosure, a solar panel system includes a solar panel and an inverter. The solar panel includes an absorber configured to absorb broad-spectrum solar radiation incident thereon and to generate heat, an emitter having nonreciprocal radiative properties, a photovoltaic cell configured to convert solar radiation to electrical energy, and an inverter configured to convert the electrical energy generated by the photovoltaic cell to an AC voltage. The inverter is configured to convert the electrical energy generated by the photovoltaic cell to an AC voltage.

In a further aspect of the present disclosure, the emitter may be configured to absorb heat and emit a narrow-band infrared radiation.

Further details and aspects of the present disclosure are described in more detail below with reference to the appended figures.

BRIEF DESCRIPTION OF THE DRAWINGS

A better understanding of the features and advantages of the present disclosure will be obtained by reference to the following detailed description that sets forth illustrative aspects, in which the principles of the present disclosure are utilized, and the accompanying figures of which:

FIGS. 9 and 10 are tables showing the properties of the NSTPV system of FIG. 1 and a reciprocal STPV system at the optimal operation points for different area ratios, respectively, in accordance with aspects of the present disclosure;

DETAILED DESCRIPTION

Figure 1:
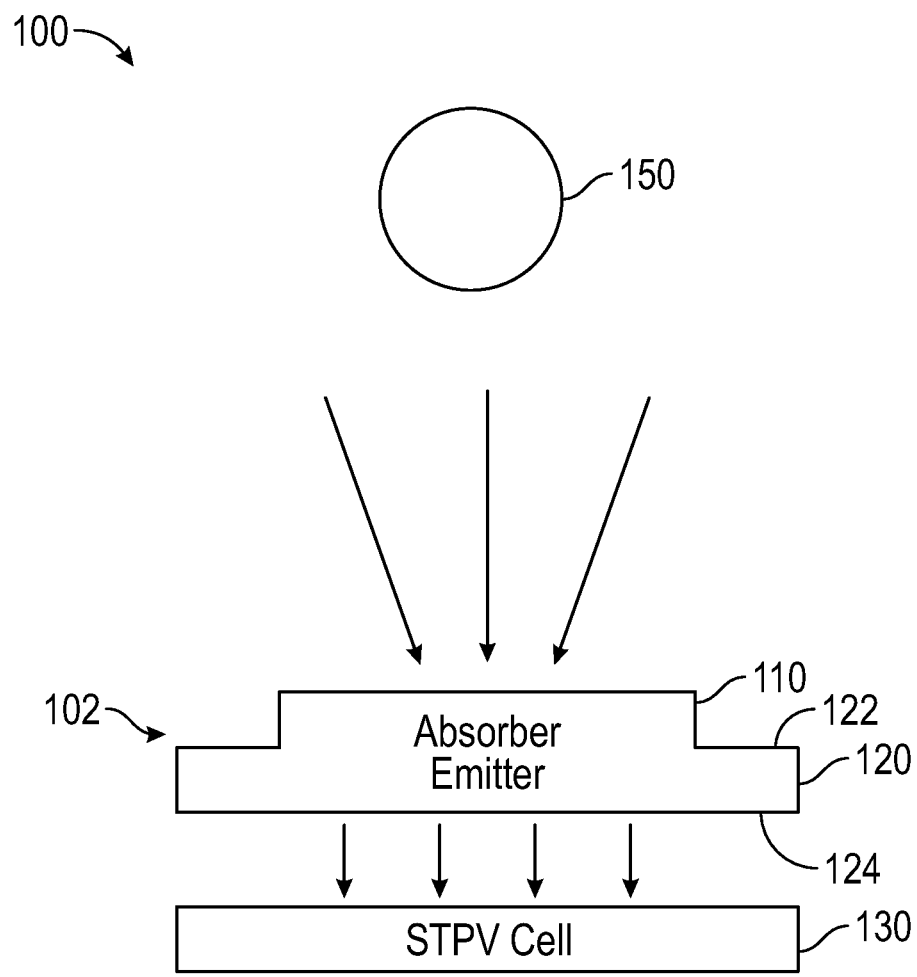
FIG. 1 is a diagram of an exemplary nonreciprocal solar thermophotovoltaic (NSTPV) system, in accordance with aspects of the present disclosure.

The present disclosure relates to nonreciprocal Solar thermophotovoltaic (STPV) systems.

Aspects of the present disclosure are described in detail with reference to the figures wherein like reference numerals identify similar or identical elements.

Although the present disclosure will be described in terms of specific aspects and examples, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary aspects illustrated in the figures, and specific language will be used to describe the same. It will nevertheless be understood that no limitation of the scope of the present disclosure is thereby intended. Any alterations and further modifications of the novel features illustrated herein, and any additional applications of the principles of the present disclosure as illustrated herein, which would occur to one skilled in the relevant art and having possession of this disclosure, are to be considered within the scope of the present disclosure.

Referring to FIG. 1, a nonreciprocal solar thermophotovoltaic (NSTPV) system 100 generally includes an intermediate layer 102 that is configured to eliminate a back emission towards a source 150 of broad-spectrum solar radiation, and a photovoltaic cell 130 configured to convert radiation from the intermediate layer 102 to electrical energy. The system 100 enables all emissions from the nonreciprocal intermediate layer 102 to be directed to the photovoltaic cell 130, leading to a higher photon flux to the photovoltaic cell and generating more electric power. The NSTPV system 100 results in efficiencies significantly higher than the Shockley-Queisser limit of solar cells and the detailed-balance limit of traditional STPV systems.

The nonreciprocal intermediate layer 102 includes an absorber 110 configured to absorb broad-spectrum solar radiation and generate heat, an emitter 120 having nonreciprocal radiative properties and is configured to absorb the heat. The nonreciprocal radiative properties include absorbing heat from the first side 122 of the emitter 120 and only emitting radiation from the second side 124 of the emitter 120.

The emitter 120 is configured to increase a photon flux to the photovoltaic cell based on the nonreciprocal radiative properties. The emitter 120 is configured to absorb incident heat and emit a narrow-band infrared radiation (e.g., the emitted wavelength may be about 1.1 micrometers, with a bandwidth of about 1 micrometer). The emitter 120 layer includes a first side configured to absorb incident heat and a second side configured to emit radiation. In aspects, the emitter 120 is configured to act as a heat circulator coupled with a blackbody. The emitter 120 may be wavelength-selective within a frequency range above a bandgap of the photovoltaic cell. The emitter 120 may include photonic crystal made of Indium Arsenide, a Weyl semimetal, and/or a magneto-optical material. In aspects, the emitter 120 may have a surface area smaller than a surface area of the absorber 110.

In aspects, the photovoltaic cell may be a single-junction photovoltaic cell, a multijunction photovoltaic cells, and/or other photonic heat engines.

Figure 2C:
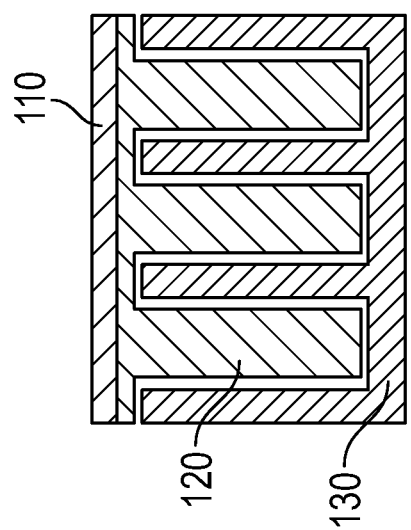
FIGS. 2A-C are diagrams illustrating various geometries for the NSTPV system of FIG. 1, in accordance with aspects of the present disclosure.
Figure 2B:
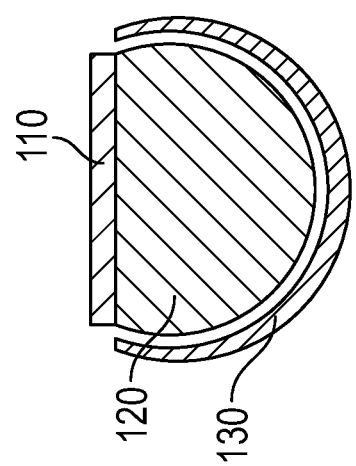
Figure 2A:
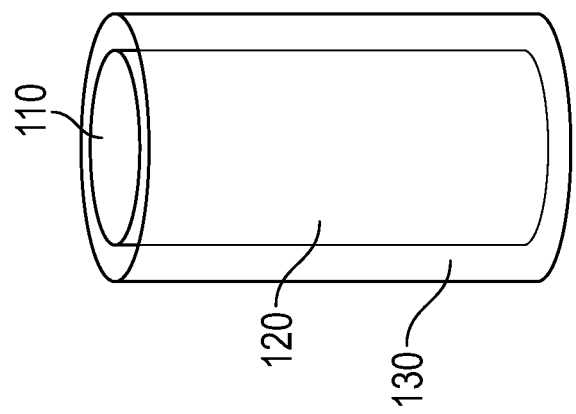

Referring to FIGS. 2A-C various geometries for the NSTPV system 100 are shown. In FIG. 2A a cylindrical shape is shown where the absorber 110 may be the top of a cylinder, and a side surface is the emitter 120. The photovoltaic cell 130 may be disposed around the emitter 120. In FIG. 2B, the absorber 110 is the top surface, and the emitter 120 is the round body beneath it. In FIG. 2C, the absorber 110 is the top surface, and the emitter 120 beneath it consists of multiple fingers that can be inserted in the regions of the photovoltaic cell 130.

Figure 3:
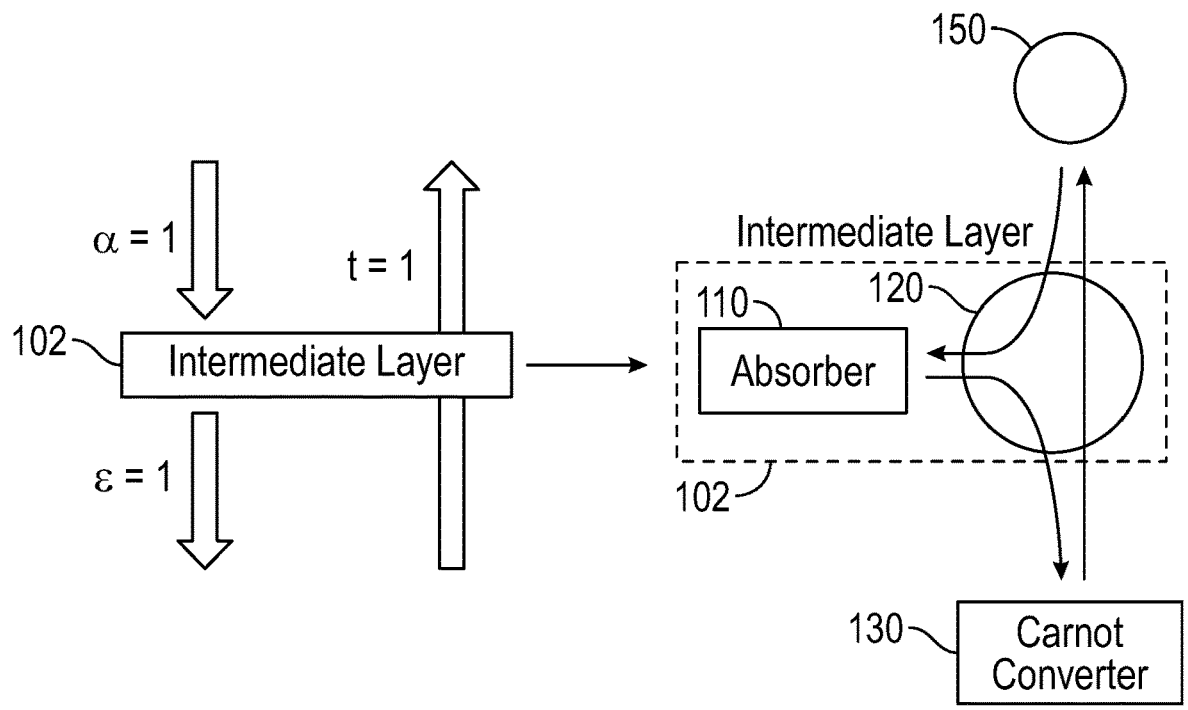
FIG. 3, a diagram illustrating the functionality of the nonreciprocal intermediate layer as a circulator coupled to a blackbody emitter, in accordance with aspects of the present disclosure.

Referring to FIG. 3, a diagram illustrating the functionality of the nonreciprocal intermediate layer 102 as a circulator coupled to a blackbody emitter is shown. The efficiency improvement is enabled by the nonreciprocal intermediate layer 102, whose functionality is depicted in FIG. 3. The frontside of the nonreciprocal intermediate layer 102 can absorb the incident energy and only emit radiation from the backside. On the other hand, when the energy is incident from the backside, the intermediate layer is completely transparent. The nonreciprocal intermediate layer 102 acts like a heat circulator coupled with a blackbody. Together the heat circulator coupled with the blackbody can absorb energy from the source 150 (e.g., the sun) and redirects the energy in the direction of the photovoltaic cell 130. The benefit of the nonreciprocal intermediate layer 102 can be illustrated in the thermodynamic analysis of the efficiencies of STPV systems.

The traditional STPV system can be improved with the disclosed nonreciprocal intermediate layer 102. In reciprocal STPV systems, the input energy from the sun, $E_s$, carries an entropy flux $$S_s = \frac{4}{3} E_s/T_s,$$

where $E_s = \sigma T_s^4$ with $\sigma$ the Boltzmann constant and $T_s$ the temperature of the sun. Since the intermediate layer is reciprocal, there is an energy flow $E_b = \sigma T_1^4$ emitted from the front side of the intermediate layer back towards the sun. Here, $T_1$ is the temperature of the intermediate layer. The associated entropy flux is $$S_b = \frac{4}{3} E_b/T_l.$$

$S_g$ is the generated entropy due to the absorption and emission process at the front surface of the intermediate layer 102, which is given by:

$$S_g = E_s\left(\frac{1}{T_l} - \frac{4}{3T_s}\right) + \frac{1}{3}\frac{E_b}{T_l} \quad \text{(Eq. 1)}$$

In the above equation, the first term is the generated entropy due to absorption, and the second term is due to emission. Heat flux from the intermediate layer is converted to work output P with a Carnot converter, and the heat flux rejected to the ambient, and its associated entropy are respectively Q and $Q/T_a$, where $T_a$ is the ambient temperature. From the energy and entropy balance:

$$E_s = E_b + Q + P \quad \text{(Eq. 2)}$$

and $$S_s + S_g = \frac{Q}{T_a} + S_b. \quad \text{(EQ. 3)}$$

The efficiency can be obtained as $$\eta = \frac{P}{E_s} = \left(1 - \frac{T_a}{T_l}\right)\left[1 - \left(\frac{T_l}{T_s}\right)^4\right]. \quad \text{(Eq. 4)}$$

By considering $T_a=300$ K and $T_s=6000$ K, the above equation has its maximum value of 85.4% when $T_l=2544$ K, which is the blackbody limit for traditional STPV systems.

Figure 4:
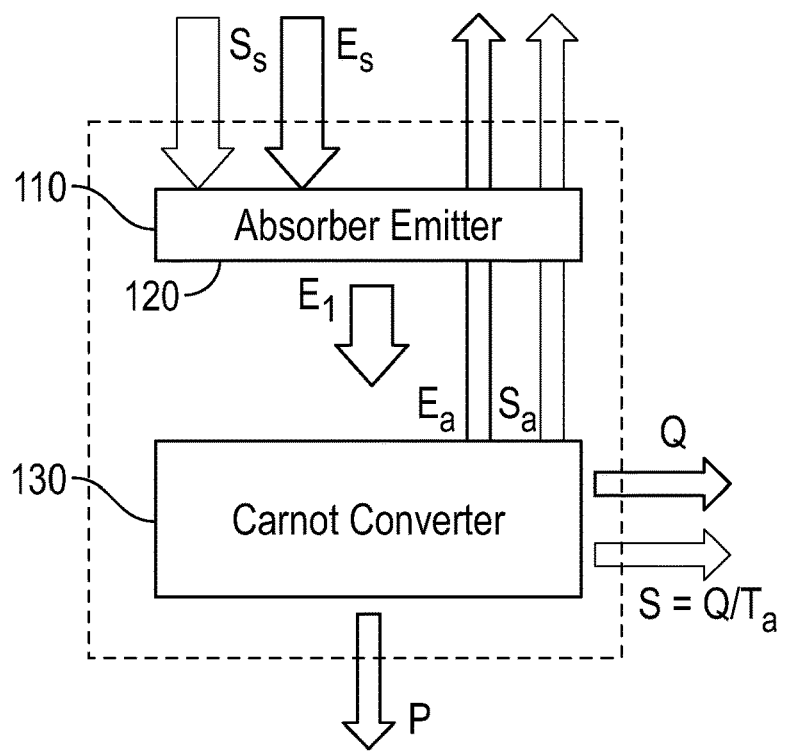
FIG. 4 is a diagram illustrating how the system of FIG. 1 eliminates the entropy production on the front side of the intermediate layer, in accordance with aspects of the present disclosure.

In contrast, in the disclosed NSTPV system 100 of FIG. 1, the nonreciprocal intermediate layer can help eliminate the entropy production on the front side of the intermediate layer (FIG. 4). For the NSTPV system 100 the nonreciprocal capability shown in FIG. 3 is achieved for all wavelengths. In this way, all photons from the source 150 (e.g., the sun) can be passed to the converter through the nonreciprocal intermediate layer 102. Meanwhile, in doing so, the incoming energy to the intermediate layer and the emitted energy from the backside is exactly equivalent, i.e., $E_s=E_l$. Therefore, at this limit, the intermediate layer 102 has the same temperature as the sun $T_l=T_s$, and the heat transfer between the sun and the intermediate layer echoes a scenario in which radiative heat flux is transferred between bodies with the same temperature. The entropy generation of the intermediate layer has a similar form as Eq. (1), $$S_g = E_s\left(\frac{1}{T_l} - \frac{4}{3T_s}\right) + \frac{1}{3}\frac{E_l}{T_l}.$$

Substituting $T_l=T_s$ and $E_l=E_s$, the generated entropy in the intermediate layer 102 can be shown to be zero. As shown below, avoiding this entropy generation can significantly improve the efficiency of the NSTPV system 100.

Since energy incident from the bottom part of the intermediate layer is perfectly transmitted, the radiated energy from the converter, $E_a$, with associated entropy $$S_a = \frac{4}{3} E_a/T_a,$$

passes through the intermediate layer and leaves the system. Thus, the energy and entropy balance for the NSTPV system 100 yield:

$$E_s = E_a + Q + P \quad \text{(Eq. 5)}$$

and $$S_s = \frac{Q}{T_a} + S_a. \quad \text{(Eq. 6)}$$

Therefore:

$$\eta = \frac{P}{E_s} = 1 - \frac{4}{3}\frac{T_a}{T_s} + \frac{1}{3}\left(\frac{T_a}{T_s}\right)^4, \quad \text{(Eq. 7)}$$

which is the Landsberg limit 93.3% and significantly higher than the blackbody limit of the traditional STPV system. Compared to existing solar energy harvesting systems that can reach the Landsberg limit, the proposed NSTPV system represents a unique system with the advantages of STPVs, including scalability, compactness, and dispatchability that allows the NSTPV system 100 to store energy for various applications.

Although reaching the ultimate limit requires using Carnot converters and broad-band nonreciprocal intermediate layer 102, the great benefit of adopting the nonreciprocal intermediate layer 102, in fact, can immediately show up in systems that use practically more accessible photonic converters such as single-junction photovoltaic cells 130.

Figure 5A:
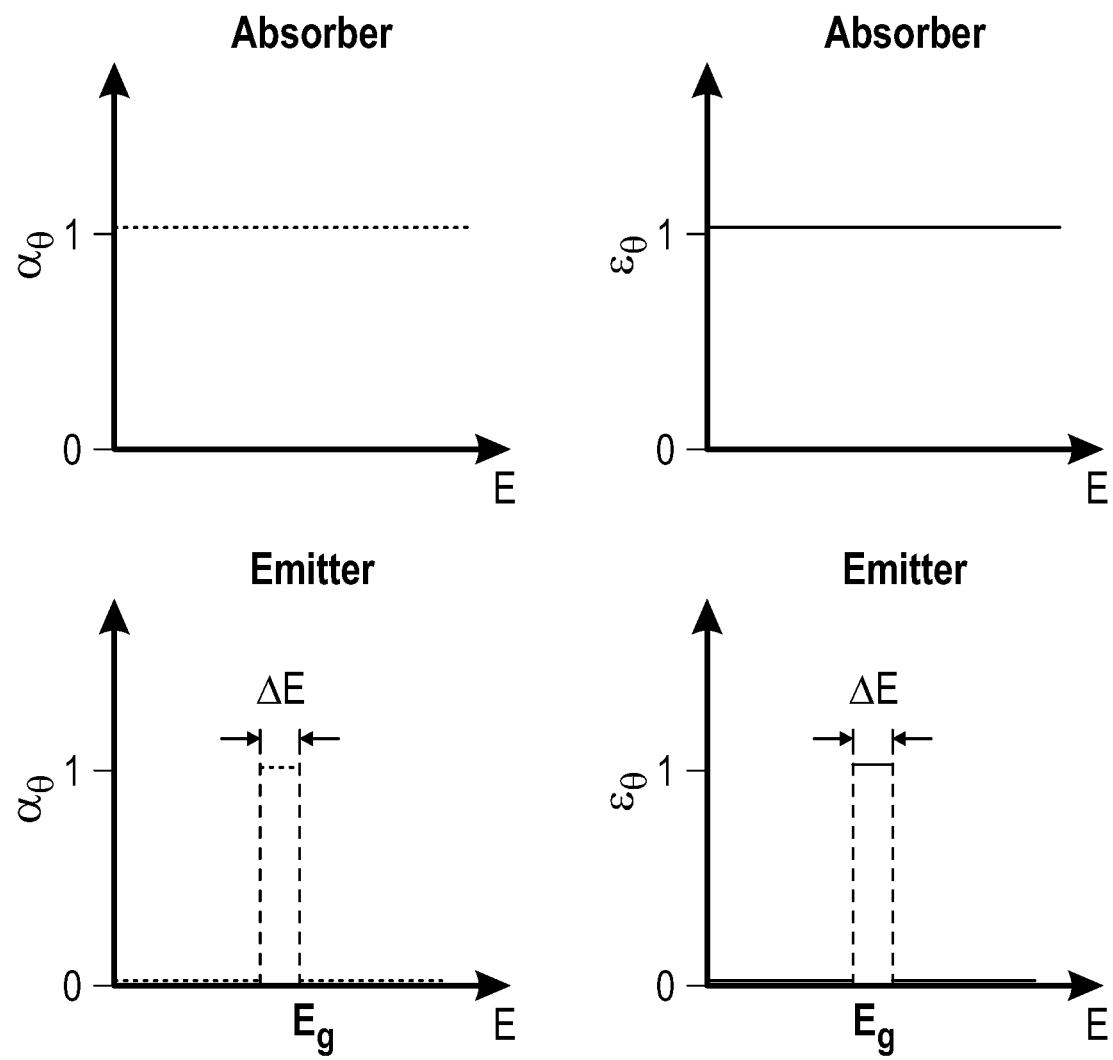
FIG. 5A is a diagram illustrating an ideal direction spectral absorptivity ($\alpha_\theta$) and emissivity ($\varepsilon_\theta$) of the intermediate layer in reciprocal STPVs, in accordance with aspects of the present disclosure.
Figure 5B:
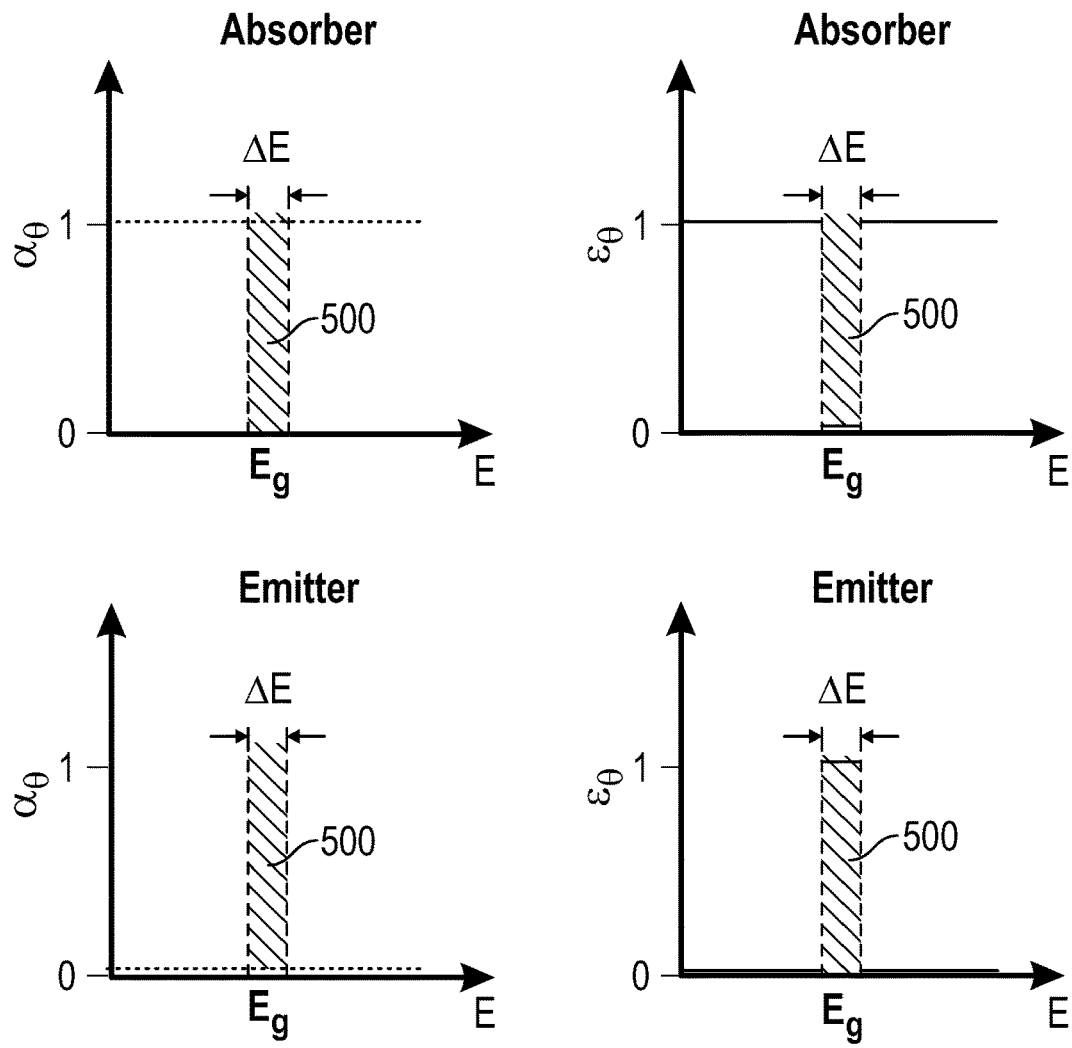
FIG. 5B is a diagram illustrating the ideal direction spectral absorptivity ($\alpha_\theta$) and emissivity ($\varepsilon_\theta$) of the intermediate layer in the NSTPV system 100 of FIG. 1, in accordance with aspects of the present disclosure.

FIGS. 5A and 5B show the ideal direction spectral absorptivity ($\alpha_\theta$) and emissivity ($\epsilon_\theta$) of the intermediate layer in reciprocal STPVs (FIG. 5A) and nonreciprocal STPVs (FIG. 5B) such as the NSTPV system 100 of FIG. 1.

Referring to FIG. 5B the nonreciprocal region 500 is shaded. For the absorber 110 in the nonreciprocal system, the properties shown in FIG. 5B hold for all angles. For the emitter 120, the properties shown in FIG. 5B hold from the normal direction to $\theta_e$, and beyond this angular range, the emitter 120 has properties the same as the emitter in the reciprocal system.

The nonreciprocal STPV system 100 includes a wavelength-selective nonreciprocal intermediate layer 102 with properties depicted in FIG. 5B for nonreciprocal STPV systems with a single-junction cell. Within the frequency range just above the bandgap, the intermediate layer 102 possesses nonreciprocal functionality. In this way, one enables useful photons to be emitted to the photovoltaic cell 130, and still brings the benefit of suppressing the back emission of the absorber 110 (FIG. 1) to the sun in this wavelength range. Outside this wavelength range, the spectral radiative properties are identical to the reciprocal case in FIG. 5A. The bandwidth of the nonreciprocal range $\Delta E$ is a parameter that can be optimized.

Figure 6:
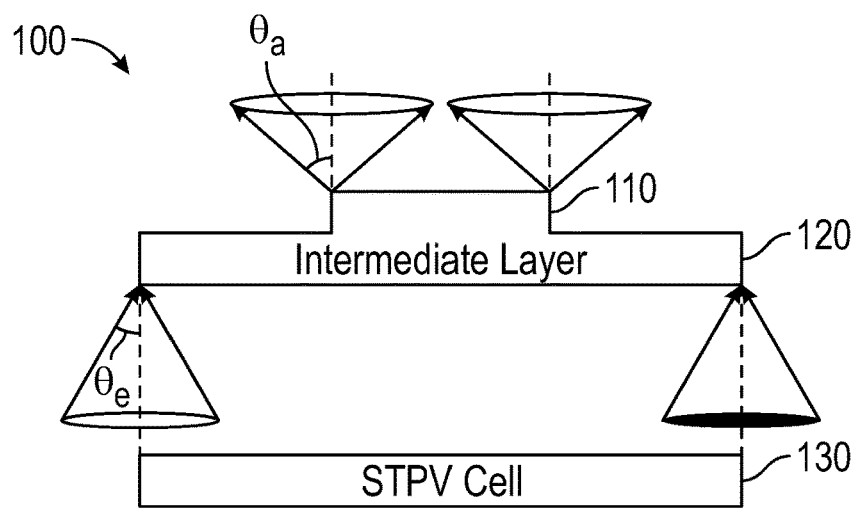
FIG. 6 is a diagram illustrating a trade-off in the spatial and angular concentration of rays due to étendue conservation in the system of FIG. 1, in accordance with aspects of the present disclosure.

Referring to FIG. 6, a diagram illustrating a trade-off in the spatial and angular concentration of rays due to étendue conservation is shown. Besides the consideration of the spectral properties, there needs to be an additional consideration of the constraint in the angular range for the nonreciprocal radiative properties. Such constraint comes from the fact that the area of the emitter is larger than the absorber for the intermediate layer. Therefore, in the nonreciprocal frequency range $\Delta E$, the back emission from the photovoltaic cell 130 needs to transmit through the intermedia layer that has a changing cross-sectional area. In this case, the angular range of the transmitted beam is subject to the constraints from the brightness theorem or the étendue conservation. The étendue occupied by the beam that is transmitted through the intermediate layer should be conserved.

For a light beam propagating through an area $dA$ within a solid angle $d\Omega$ in a medium with refractive index n, its étendue can be expressed as $n^2 dA \cos\theta d\Omega$, where $\theta$ is the polar angle and $d\Omega = \sin\theta d\theta d\phi$ with $\phi$ the azimuthal angle. Without losing generality, a beam within a cone centered in the normal direction up to a certain polar angle is considered. Its étendue is $\int_0^{2\pi}\int_0^\theta n^2 dA \cos\theta \sin\theta d\theta d\phi = \pi n^2 A \sin^2\theta$ (Eq. 8)

In the nonreciprocal STPV system 100, the incident medium and the transmitted medium are the same. Thus, the étendue conservation results in $A_e \sin^2\theta_e = A_a \sin^2\theta_a$, where $A_e$ and $A_a$ are the areas of the emitter and absorber, respectively, and $\theta_e$ and $\theta_a$ are the polar angles a beam occupies on the emitter and absorber sides, respectively. Thus, the maximum étendue that the transmitted beam can occupy is limited by the absorber side, which has a smaller area. In order to enable the most benefit from the nonreciprocity, in the nonreciprocal frequency range $\Delta E$, set $\theta_a = \pi/2$ such that the étendue that has the nonreciprocal functionality can be maximized. In doing so, $\theta_e = \sin^{-1}(\beta^{-1/2})$, where $\beta = A_e/A_a$ is the ratio of the area of the emitter 120 and the area of the absorber 110. For the angular range of $(0, \theta_e)$, the transmissivity of the emitter is unity, and therefore the absorptivity of the emitter, $\alpha_\theta$, in this range is zero. For the rest of the angular range $(\theta_e, \pi/2)$, the emitter has the same properties as in the reciprocal case, i.e., $\alpha_\theta = 1$.

For reciprocal STPV systems, the temperature of the intermediate layer can be solved from the energy balance: $A_a E_s + A_e E_c(E_g, E_g + \Delta E, V, T_c) = A_a E_b(0, \infty, 0, T_I) + A_e E_I(E_g, E_g + \Delta E, 0, T_I)$ (Eq. 9)

The area of the photovoltaic cell $A_c$ is the same with $A_e$, and the photovoltaic cell 130 and the emitter 120 are close enough so that the view factor between them is unity. $T_c$ is the temperature of the photovoltaic cell 130, $E_c$ is the emitted energy by the photovoltaic cell 130, $E_b$ is the energy emitted from the absorber 120 towards the sun, and $E_I$ is the energy emitted from the intermediate layer to the photovoltaic cell 130. The energy fluxes are obtained as $$E(E_1, E_2, V, T) = \frac{2\pi}{h^3 c^2}\int_{E_1}^{E_2} \frac{E^3}{\exp\left(\frac{E-qV}{kT}\right)-1} dE. \quad \text{(Eq. 10)}$$

where T is the temperature of the emitter, $E_1$ and $E_2$ are the lower and higher energy bounds of the integration, respectively. qV is the chemical potential of photons, where V is the voltage on the emitter. For the intermediate layer, V=0, and for the photovoltaic cell, V>0 for the above bandgap part. The external quantum efficiency of the photovoltaic cell 130 is assumed to be unity. In this case, the voltage and current of the photovoltaic cell 130 can be obtained based on a detailed balance $I = qA_c[N(E_g, E_g+\Delta E, 0, T_I) - N(E_g, E_g+\Delta E, V, T_c)]$ (Eq. 11)
where N is the photon flux obtained as $$N(E_1, E_2, V, T) = \frac{2\pi}{h^3 c^2}\int_{E_1}^{E_2} \frac{E^2}{\exp\left(\frac{E-qV}{kT}\right)-1} dE. \quad \text{(Eq. 12)}$$

The photovoltaic cell 130 and the intermediate layer 102 equations are coupled, and the temperature of the intermediate layer 102 and the voltage and current of the photovoltaic cell 130 are solved using an iterative approach for different area ratios. The efficiency of the STPV system is defined as $$\eta = \frac{P}{E_s},$$

where P=IV is the produced electricity. For each $\beta$, search for $\Delta E$ and $E_g$ to find the highest efficiency. The solved efficiencies, which represent the limiting performance given by detailed balance for STPV systems 100 with single-junction photovoltaic cells 130, are shown as curve 702 in FIG. 7. As β increases, the bandwidth of the emitter becomes narrower, and thus higher content of emitted energy can be converted to electricity, yielding a higher efficiency. The efficiency surpasses the SQ limit when β is larger than about 3, indicating a minimum required area ratio for single-junction STPV to outperform the SQ limit. The bandgaps and ΔE at different β are provided in the supplement.

As noted previously, an infinitely large area ratio is needed to reach the ultimate efficiency. This can be readily shown with the above equations. In this case, ΔE approaches zero, the photons fluxes may be obtained as $$N_e = \frac{2\pi}{h^3 c^2} \frac{E_g^2}{\exp\left(\frac{E_g}{kT_I}\right) - 1} \delta E \quad \text{(EQ. 13)}$$

and $$N_c = \frac{2\pi}{h^3 c^2} \frac{E_g^2}{\exp\left(\frac{E_g - qV}{kT_c}\right) - 1} \delta E. \quad \text{(Eq. 14)}$$

Here, $N_e$ and $N_c$ are the photon fluxes from the emitter 120 and the photovoltaic cell 130, respectively. The efficiency of the converter can be defined as $$\eta_{PV} = \frac{W}{Q},$$

where and $Q = E_g(N_e - N_c)$. Therefore, in this limiting case $$\eta_{PV} = \frac{qV}{E_g}. \quad \text{(Eq. 15)}$$

The highest efficiency happens when the voltage is approaching the highest value, which is the open-circuit voltage ($V_{OC}$) obtained by setting I=0 in Eq. (11)

$$\frac{E_g}{kT_I} = \frac{E_g - qV_{OC}}{kT_c}. \quad \text{(Eq. 16)}$$

Combining Eqs. (15) and (16)

$$\eta_{PV} = 1 - \frac{T_c}{T_I}$$

is obtained, indicating that the photovoltaic cell 130 is a Carnot convertor in the monochromatic limit. Since the absorber 110 is essentially a blackbody, in this case, the overall efficiency is shown as Eq. (4), yielding 85.4% at $T_I$=2544 K, the blackbody limit.

FIG. 5B depicts the NSTPV system 100 of FIG. 1 with an intermediate layer that possesses radiative properties. Compared to a reciprocal STPV, the detailed balance and the efficiency calculation for the photovoltaic cell are the same. The energy balance for the intermediate layer of the NSTPV system 100 of FIG. 1 is different:

$$A_a E_s + \alpha A_e E_c(E_g, E_g + \Delta E, V, T_c) = A_a E_b(0, E_g, 0, T_I) + A_a E_b \\ (E_g + \Delta E, \infty, 0, T_I) + A_e E_i(E_g, E_g + \Delta E, 0, T_I). \quad \text{(Eq. 17)}$$

where $$\alpha = \frac{\int_0^{2\pi} \int_0^{\pi/2} \alpha_\theta \cos\theta \sin\theta d\theta d\phi}{\int_0^{2\pi} \int_0^{\pi/2} \cos\theta \sin\theta d\theta d\phi} = 1 - \sin^2\theta_e \quad \text{(Eq. 18)}$$

is the hemispherical absorptivity of the emitter in the nonreciprocal frequency range ΔE. In the NSTPV system 100, the étendue of the transmitted emission from the photovoltaic cell 130 through the intermediate layer 102 (the lost energy as compared to the reciprocal system) is the same as the étendue of the suppressed radiation from the intermediate layer 102 towards the sun (the suppressed energy loss as compared to the reciprocal system). Since the intensity of emission from the intermediate layer 102 is always higher than that from the photovoltaic cell 130, the nonreciprocal functionality allows a higher energy flux to the NSTPV system 100 and a higher temperature of the nonreciprocal intermediate layer 102 compared to a reciprocal STPV system. Thus, the efficiency of the NSTPV system 100 is always higher than a STPV, as shown in FIG. 7, indicating the significant benefits and effectiveness of NSTPV systems 100.

Figure 7:
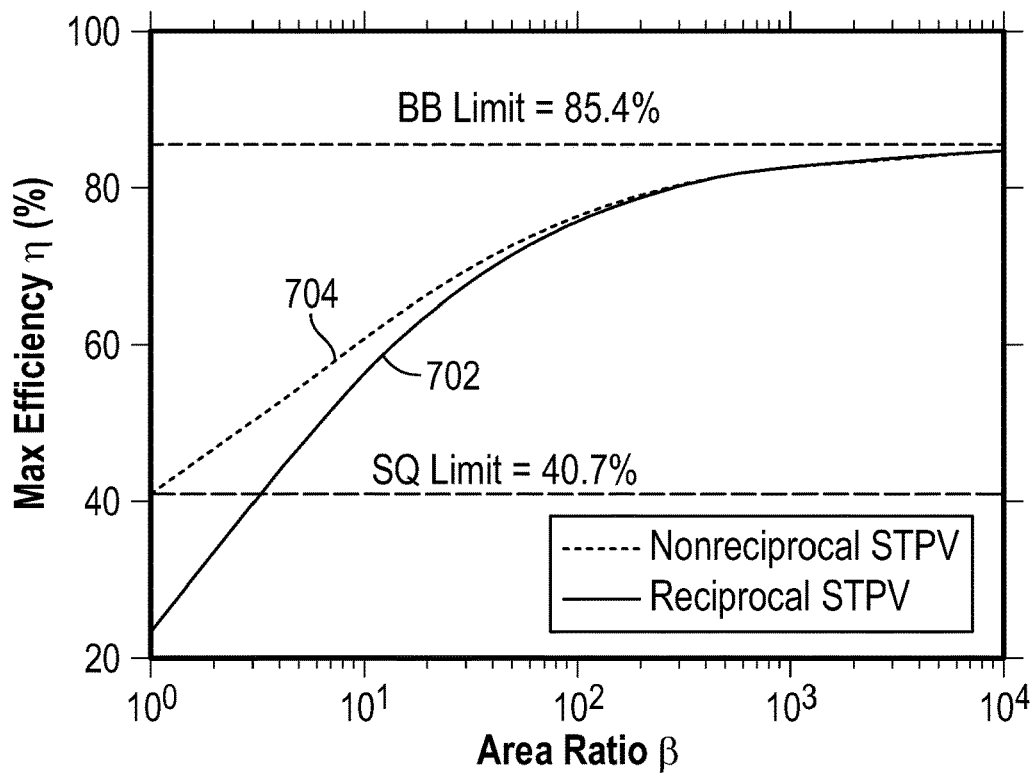
FIG. 7 is a graph illustrating max efficiency vs. area ratio, in accordance with aspects of the present disclosure.

With reference to FIG. 7, a graph illustrating the efficiency of nonreciprocal and reciprocal STPV with a single-junction photovoltaic cell for different area ratios β. Curves 704 and 702 show the efficiencies of NSTPVs and reciprocal STPVs, respectively. The Shockley-Queisser limit and the blackbody limit are independent from β. Shockley-Queisser limit and the blackbody limit are marked as horizontal dashed lines.

For β=1, Eq. (17) yields $T_I = T_s$ regardless of the choice of ΔE. Such a scenario resembles the case when the sun directly illuminates the photovoltaic cell. Therefore, the maximum power production happens when the incoming photon flux is maximized, i.e., ΔE=∞, and the efficiency equals the SQ limit. For larger β, the efficiency increases for the same reason as the reciprocal STPV. Therefore, the nonreciprocal STPV systems can outperform the SQ limit for all area ratios higher than 1. For small β, the optimized ΔE is relatively large. In this case, the suppressed radiated energy from the absorber is much stronger than the emission from the photovoltaic cell 130, and consequently, the NSTPV system 100 has much higher efficiency than a reciprocal system. As β increases, the optimized ΔE becomes smaller, and the temperature of the intermediate layer also decreases (see supplement material). Therefore, the benefits of the suppressed back emission due to non-reciprocity become weaker. In fact, in the limiting case with an infinitely large area ratio, $\theta_e \approx 0$ and ΔE become infinitesimal. Thus, the energy balance equation of the nonreciprocal system will approach the reciprocal system, resulting in the same limit for both systems.

A large area ratio can induce several critical issues and is not favored in practice. For example, a large β causes larger thermal resistance from the absorber 110 to the emitter 120, inefficient cooling of the photovoltaic cell 130, and significant energy loss due to convection from the intermediate layer. Thus, the suggested area ratio for STPVs is about 10, which falls in the region where the efficiencies of NSPTVs are much higher than STPVs. Therefore, the proposed NSTPV system 100 represents a pathway to significantly improve the performance of NSTPV system 100 in practice.

Figure 8:
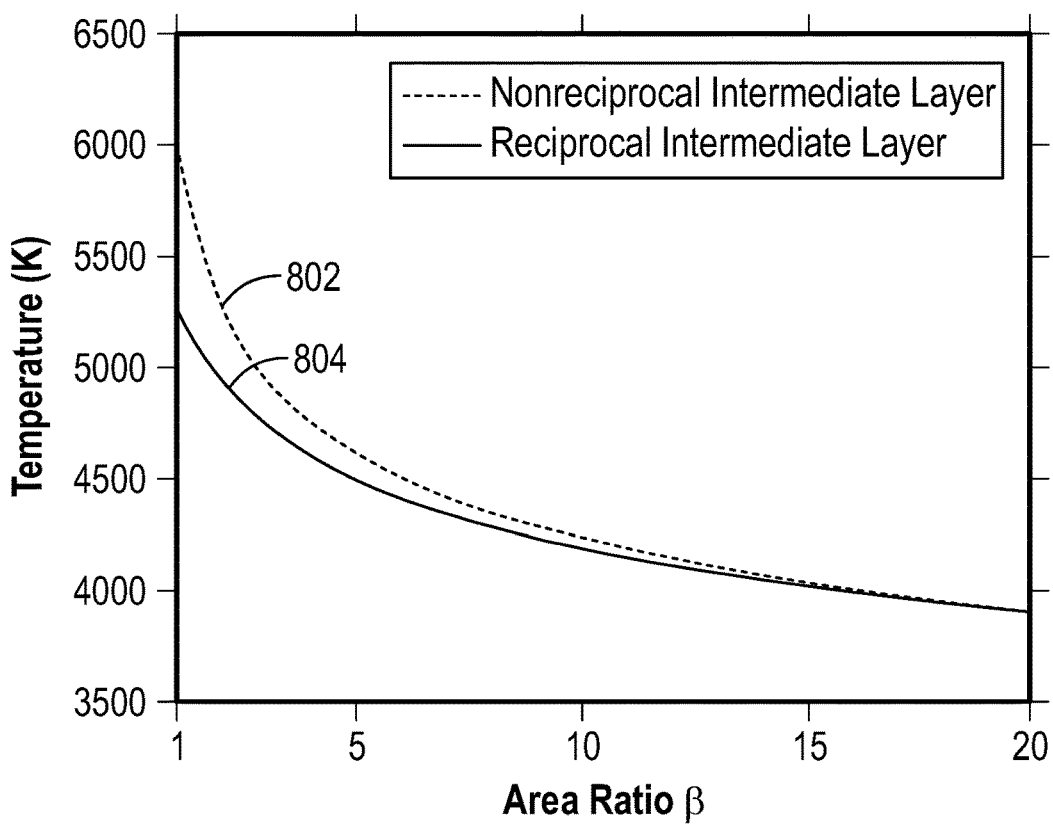
FIG. 8 is a graph that illustrates the temperature of the intermediate layer in reciprocal STPV and NSTPV (such as the system of FIG. 1) at each area ratio, in accordance with aspects of the present disclosure.

FIG. 8 is a graph that illustrates the temperature of the intermediate layer in reciprocal STPV 804 and nonreciprocal STPV 802 (such as the system of FIG. 1) at each area ratio. As the area ratio increase, the operation temperature of the intermediate layer decrease, with the nonreciprocal case and the reciprocal case approaching each other.

FIGS. 9 and 10 are tables showing the properties of the NSTPV system 100 and reciprocal STPV system at the optimal operation points for different area ratios, respectively.

Figure 11:
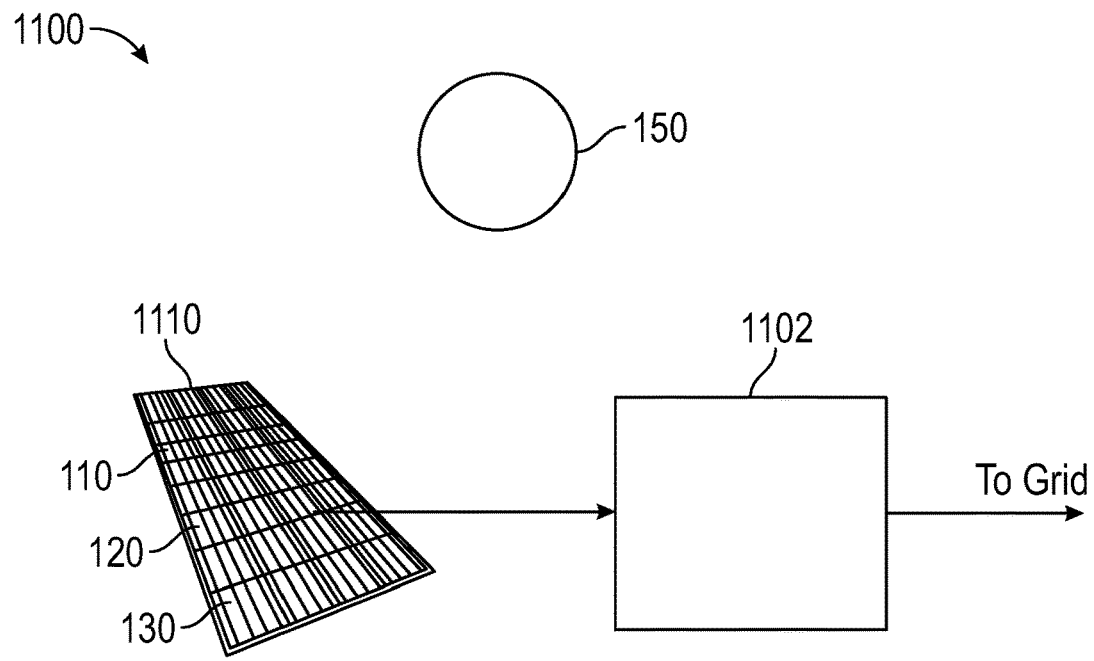
FIG. 11 shows a solar panel system, in accordance with aspects of the present disclosure.

FIG. 11 shows a solar panel system 110. The solar panel system 110 generally includes a solar panel 1110 including an absorber 110 configured to absorb broad-spectrum solar radiation incident thereon and to generate heat, an emitter 120 having nonreciprocal radiative properties, a photovoltaic cell 130 configured to convert solar radiation to electrical energy, and an inverter 1102 configured to convert the electrical energy generated by the photovoltaic cell to an AC voltage. In aspects, the system 110 may include a thermal energy storage unit. The system 110 has the benefit of providing efficiency and economic advantages over traditional combined cycle turbines for power generation in concentrated solar power plants.

Figure 12:
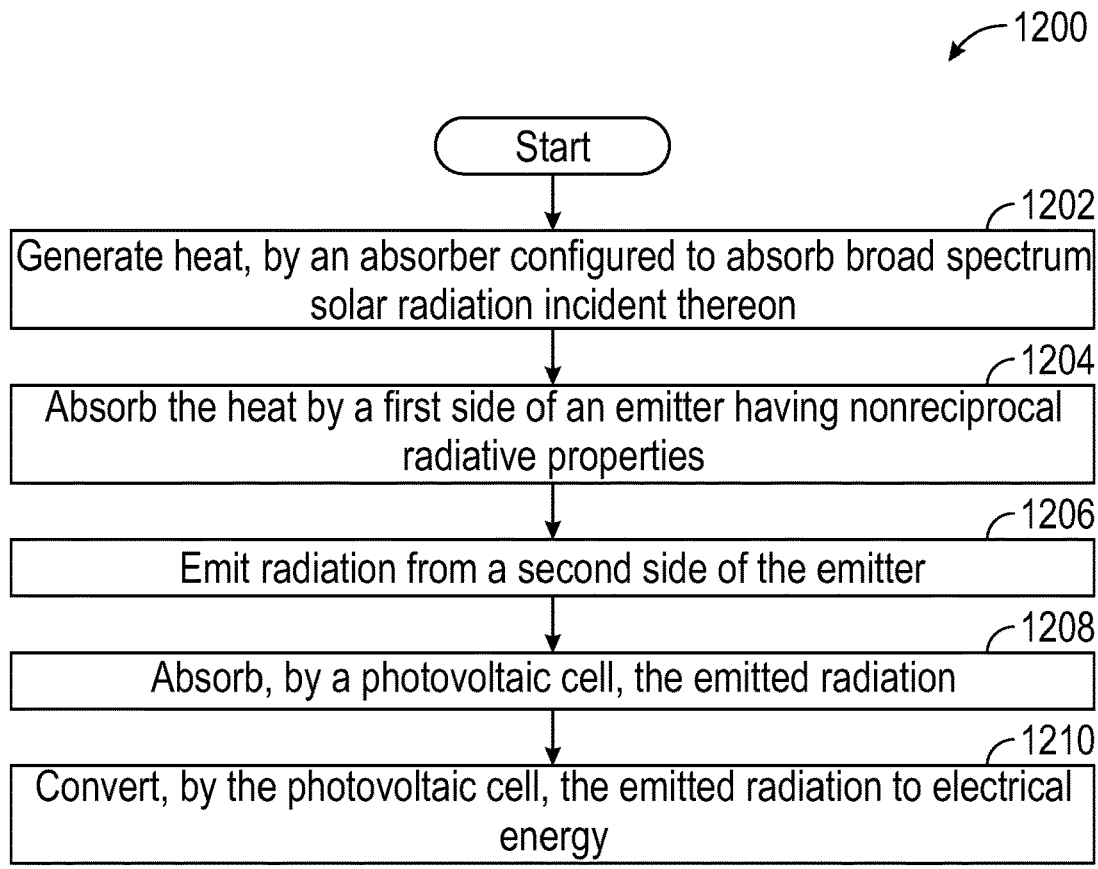
FIG. 12 is a flow diagram of a method of use for the NSTPV system of FIG. 1, in accordance with aspects of the present disclosure.

FIG. 12 is a flow diagram of a method of use for NSTPV system 100 of FIG. 1. Although the steps are presented in an order, it is contemplated that the steps may be performed in any reasonable order.

Initially, at step 1202, the NSTPV system 100 generates heat by an absorber 110. The absorber 110 is configured to absorb broad-spectrum solar radiation incident thereon.

Next, at step 1204, the NSTPV system 100 absorbs the heat by a first side of an emitter 120 that has nonreciprocal radiative properties. In aspects, the NSTPV system 100 may filter the broad-band solar radiation to a frequency range narrower than the broad-band solar radiation by a wavelength-selective property of the emitter 120 wherein the frequency range is above a bandgap of the photovoltaic cell 130.

Next, at step 1206, the NSTPV system 100 emits radiation from a second side of the emitter.

Next, at step 1208, the NSTPV system 100 absorbs, by a photovoltaic cell 130, the emitted radiation.

Next, at step 1210, the NSTPV system 100 converts by the photovoltaic cell 130, the emitted radiation to electrical energy.

Certain aspects of the present disclosure may include some, all, or none of the above advantages and/or one or more other advantages readily apparent to those skilled in the art from the figures, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in aspects," "in various aspects," "in some aspects," or "in other aspects" may each refer to one or more of the same or different example Aspects provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached figures are presented only to demonstrate certain examples of the disclosure. Other elements, steps, methods, and techniques that are insubstantially different from those described above and/or in the appended claims are also intended to be within the scope of the disclosure.

What is claimed is:

1. A nonreciprocal solar thermophotovoltaic (STPV) system comprising:
a cylinder including:
a nonreciprocal intermediate layer, configured to eliminate a back emission towards a source of broad-spectrum solar radiation, the nonreciprocal intermediate layer including:
an absorber configured to absorb broad-spectrum solar radiation and generate heat, the absorber being a side surface of the cylinder; and
an emitter having nonreciprocal radiative properties and configured to absorb the heat, wherein the emitter is disposed on a top surface of the cylinder; and
a photovoltaic cell configured to convert radiation from the emitter to electrical energy, wherein the photovoltaic cell is cylindrically disposed around the cylinder, wherein a first intensity of emission from the nonreciprocal intermediate layer is higher than a second intensity of emission from the photovoltaic cell.

2. The STPV system according to claim 1, wherein the emitter is configured to increase a photon flux to the photovoltaic cell based on the nonreciprocal radiative properties.

3. The STPV system according to claim 1, wherein the emitter is configured to absorb incident heat and emit a narrow-band infrared radiation.

4. The STPV system according to claim 1, wherein the emitter includes a first side configured to absorb incident heat and a second side configured to emit radiation.

5. The STPV system according to claim 4, wherein the nonreciprocal radiative properties include absorbing heat from the first side of the emitter and only emitting radiation from the second side of the emitter.

6. The STPV system according to claim 1, wherein the photovoltaic cell is a single-junction photovoltaic cell.

7. The STPV system according to claim 1, wherein the emitter is configured to act as a heat circulator coupled with a blackbody.

8. The STPV system according to claim 1, wherein the emitter is wavelength-selective within a frequency range above a bandgap of the photovoltaic cell.

9. The STPV system according to claim 1, wherein the emitter includes at least one of photonic crystal made of Indium Arsenide, a Weyl semimetal, and/or a magneto-optical material.

10. The STPV system according to claim 1, wherein the STPV system include a planar or a cylindrical shape includes a planar or a cylindrical shape.

11. The STPV system according to claim 4, wherein the absorbed incident heat and the emitted radiation are exactly equivalent.

* * * * *